Nov. 11, 1969    W. H. RANEY    3,477,360
PORTABLE OUTDOOR FOOD COOKING APPARATUS
Filed Dec. 18, 1967    2 Sheets-Sheet 1
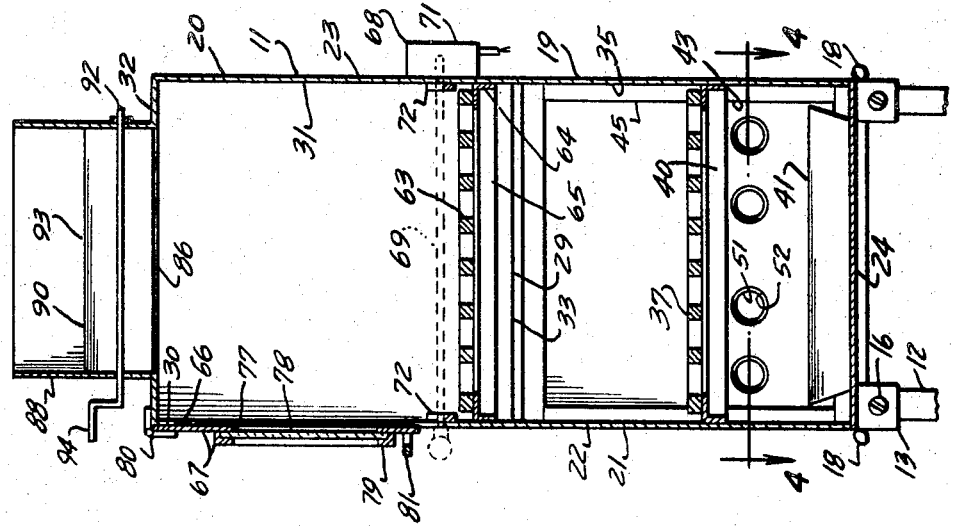
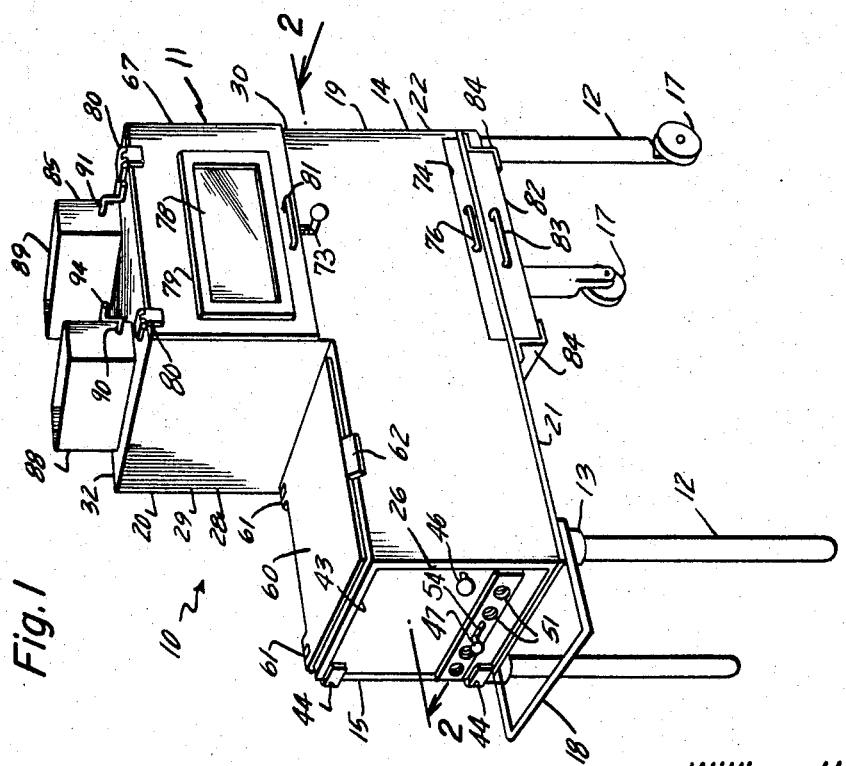
William H. Raney
INVENTOR.
BY Roger L. Martin
ATTORNEY

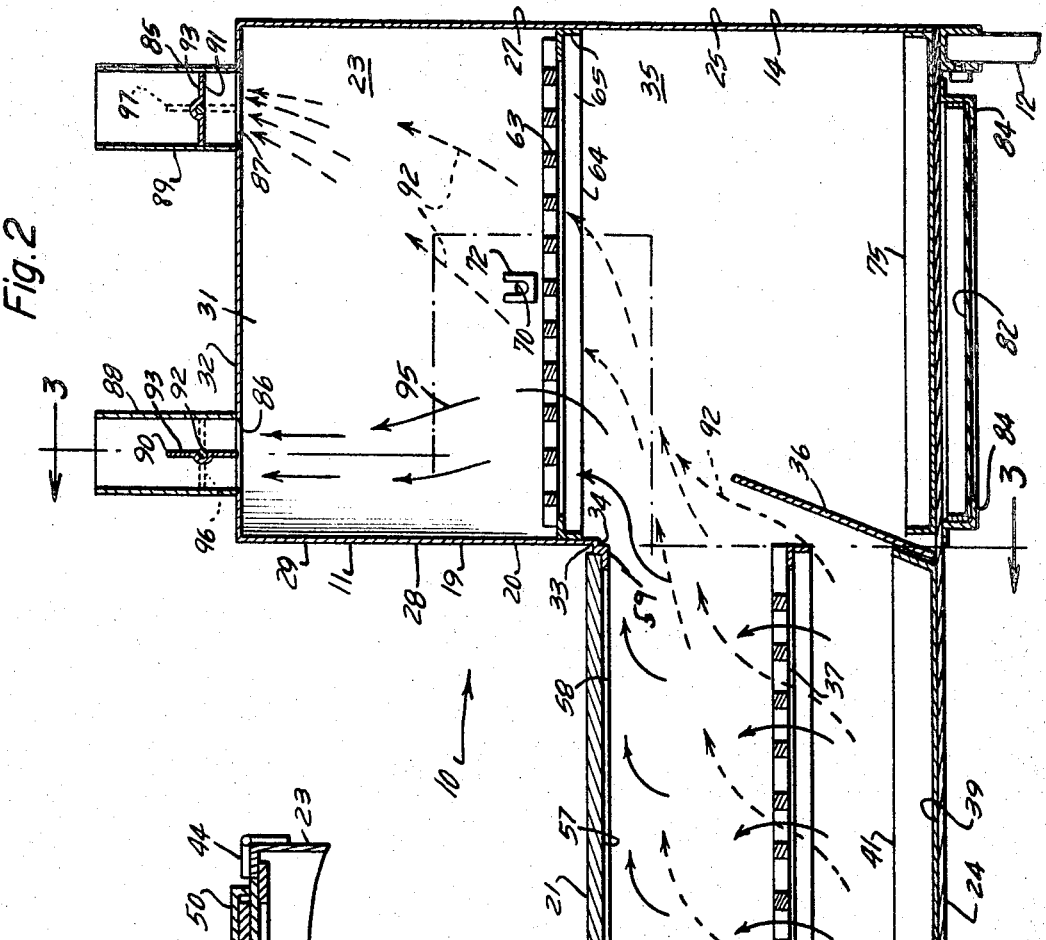

United States Patent Office 3,477,360
Patented Nov. 11, 1969

3,477,360
PORTABLE OUTDOOR FOOD COOKING
APPARATUS
William H. Raney, 4320 E. Fort King,
Ocala, Fla. 32670
Filed Dec. 18, 1967, Ser. No. 691,344
Int. Cl. F24b 1/22
U.S. Cl. 99—339     3 Claims

ABSTRACT OF THE DISCLOSURE

A portable outdoor food cooking apparatus which is equipped with a cooking compartment and a fuel combustion compartment is disclosed. Heat is supplied to the cooking compartment by the discharge of the gaseous combustion products into the compartment and the combustion compartment has a hot plate used for cooking foods exteriorly of the apparatus. A dual vent arrangement is provided at the top of the cooking compartment to control heat dissipation through the hot plate.

---

The invention relates to an improved outdoor food cooking apparatus which is portable.

Outdoor food cooking apparatuses are well-known in the art but the portable types which require compactness and the use of light weight construction techniques are usually less than satisfactory to the chefs for the reasons that a hot plate is often omitted in the structure and the combustion compartment is usually located beneath a broiling grill so that the grease and other drippings from the meats and other foods being cooked on the grill fall directly into the combustion compartment where they burn and add to the combustion products. Without the hot plate, a complete meal can rarely be conveniently cooked on such portable cooking apparatuses, and it is well-known that the combustion products of grease drippings and the like tend to mask the better flavors in broiled and barbequed meats, not to mention the problems of flame control that result from the ignition of the grease drippings in the combustion compartment.

Arrangements where the combustion compartments are laterally arranged with respect to the cooking compartments, which serve to avoid the problems associated with grease drippings and enable the provision of a hot plate which overlies the combustible material, are generally avoided by manufactures because current venting systems for the gaseous combustion products are inadequate to provide satisfactory distribution of the heat between the hot plate and cooking compartment. With current systems known to the inventor, much of the heat is dissipated through the hot plate whether the plate is in use or not. This is not only wasteful of the fuel but tends to place a design limitation on the size of the cooking compartment in order to obtain satisfactory cooking temperatures therein when sheet metal materials are used in construction of such compartments since such materials rapidly conduct their heat from the cooking area.

The invention relates to an improved portable outdoor food cooking apparatus that has a hot plate for cooking foods at the exterior of the apparatus and a cooking compartment for smoking and cooking foods in the interior of the apparatus in a novel arrangement with a system for venting the gaseous fuel combustion products from the apparatus that enables better control of the heat dissipation to the exterior and interior cooking areas.

A general object is to provide an improved portable outdoor food cooking apparatus.

One particular object is to provide an arrangement for a cooking compartment and a combustion compartment in a portable outdoor cooking apparatus that enables the embodiment of a hot plate in the structure of the apparatus with the simultaneous avoidance of the problems associated with grease drippings in the cooking compartment of the apparatus and wherein heat dissipation through the hot plate can be effectively controlled by the chef to minimize heat losses through the hot plate when the component is not in use.

Yet another object of the invention is to provide a novel arrangement in an outdoor cooking apparatus which is equipped with a hot plate for cooking foods at the exterior of the apparatus and a cooking compartment for cooking foods interiorly of the apparatus and wherein light weight construction techniques involving the use of sheet metal materials can be employed.

In accord with the invention the fuel combustion compartment has a hot plate which is heated by the fuel in the compartment and the compartment is located at one side of the cooking compartment in an arrangement such that the gaseous combustion products discharge into the cooking compartment and thence through a venting system which is arranged at the upper end of the cooking compartment. The system involves separate vents and each vent is equipped with a damper that can be manipulated from the exterior of the compartment and through control of the separate dampers more or less heat can be caused to be dissipated through the hot plate component of the apparatus.

The novel features which are believed to be characteristic of this invention are set forth with particularity in the appended claims. The invention itself, however, both as to its organization and method of operation, together with further objections and advantages thereof, may best be understood by reference to the following description taken in connection with the accompanying drawings in which:

FIG. 1 is a perspective view of an apparatus embodying the invention;

FIG. 2 is a longitudinal vertical section view taken generally along the lines 2—2 of FIG. 1 with certain parts broken and others removed;

FIG. 3 is a transverse vertical section view taken generally along the lines 3—3 in FIG. 2; and FIG. 4 is a transverse horizontal section showing a fragment of the apparatus as seen along the lines 4—4 of FIG. 3.

Reference is now made to the drawings and wherein the portable outdoor food cooking apparatus embodying the concepts of the invention is generally designated at 10. Apparatus 10 has a hollow body portion 11 which, as seen in FIG. 1, is supported above the ground on suitable legs collectively designated at 12. The legs 12 are detachable from the body portion 11 to enable compactness for shipping purposes, and fit in suitable socket elements 13. These elements 13 are located at the opposite ends 14 and 15 of the body and the legs 12 are secured in these sockets by means of set screws 16. The legs 12 at one end 14 of the body are equipped with wheels 17 whereas the handle 18 is fixed to the body portion at the other end 15 to enable the user to lift the adjacent end and roll the apparatus over the ground when the need arises to transport the apparatus from one place to another in the general area of usage.

The body portion 11 has an exterior wall 19 which provides a cooking compartment 20 at one end of the apparatus and a fuel combustion compartment 21 at the other end of the apparatus. Body wall 19 has front and rear side wall sections 22 and 23 which are spaced apart and mounted upright at the front and rear edges of an elongated rectangular bottom wall section 24. At end 14, sections 22 and 23 are spaced apart and welded to an upright end wall section 25 whereas at the other end 15 sections 22 and 23 are joined to an upright end wall section 26. Sections 25 and 26 are arranged transversely in the body structure and are supported at the opposite ends of the apparatus on the bottom wall section 24.

The cooking compartment 20 has opposite sides 27 and 28 and at side 28 the body wall 19 has a rectangular center wall section 29 which is arranged upright and in parallel with the end wall section 25 at the opposite side 27 of the compartment. Section 29 is located generally intermediate of the opposite ends 14 and 15 of the body and is welded at its opposite ends to vertical extensions 30 and 31 in wall sections 22 and 23 at the front and rear sides of the cooking compartment. The top side of compartment 20 is formed by a top wall section 32 of the body wall 19 and which is welded to the upper ends of sections 25 and 29.

The combustion compartment 21 is arranged laterally of the cooking compartment 20 as is evident from FIG. 2 and the center wall section 29 is supported in the body structure spacedly above the bottom wall section 24. This arrangement provides an internal body opening 34 beneath the foot end 33 of wall section 29 and enables the gaseous fuel combustion products to pass from the combustion chamber or compartment 21 into the cooking chamber or compartment 20. Here in the body interior 35 a transversely arranged rectangular plate is provided at the lower end of opening 34. Plate 36 rests on the bottom wall section 24 and is fixed at its opposite ends to side wall sections 22 and 23 in an inclined position so as to deflect the gaseous combustion products that are passing through the opening in a generally upward direction in cooking compartment 20.

The fuel, which can be wood, charcoal or other suitable combustible material, is supported in the combustion chamber 21 on a horizontally arranged rectangular grate designated at 37. Grate 37 is located generally intermediate the upper 38 and lower 39 ends of the compartment and rests on angles 40 which are appropriately positioned in the interior of the compartment and fixed to the side walls thereof.

The compartment 21 is equipped with a shallow rectangular pan 41 that rests on the bottom wall section 24 at the lower end of the compartment and which serves as a receptacle for the ashes that fall through the openings in the grate structure. The pan 41 and grate 37 can be removed from the combustion compartment 21 through a rectangular opening 42 in end wall section 26. Here the apparatus is provided with a rectangular door 43 which is shown in a closed position in the drawings but which is hinged by hinges 44 to the back wall section 23 so as to be pivotally movable to an open position about the vertical pivot axis etsablished by the hinges 44. Wall section 26 is reinforced by elongated metal strips 45 around the opening 42 and these strips serve as stops when the door is swung to the closed position. As seen in FIG. 1, the door is provided with a suitable handle 46 to facilitate its manipulation between open and closed positions.

The draft 47 for the combustion compartment 21 is located at the bottom of the door 43 so that the air for combustion is admitted to the compartment at the underside of grate 37. Draft 47 includes an elongated plate 48 which is provided with spaced apertures 49 and the plate is slidably supported in an appropriate retainer which is fixed to the outside of the door 43 and provided with spaced apertures 51. The apertures 51 in the retainer 50 are aligned with appropriately spaced apertures 52 in door 43 and when the draft 47 is in the open position shown in FIG. 4 are also in alignment with the apertures 49 in the slide plate 48. Plate 48 is equipped with a pin 53 which projects through a slot 54 in the retainer 50 and the pin is provided with a knob 55 to facilitate movement of the plate as in the direction of arrow 56 to a closed draft position. It is deemed evident that the air supplied to the combustion compartment can be regulated and controlled by adjusting the position of the plate 48 to various positions which can be selected between the open and closed positions for the draft component.

The upper end 38 of compartment 21 has a rectangular frame work 58 which is made up of angles 59 that are appropriately fixed to the wall sections of the apparatus and which provides an upwardly facing rectangular opening 57 at the upper end of the fire box. Here the apparatus is provided with a rectangular plate that covers the opening 57 and which is hinged to rear side wall section 23 for pivotal movement about a horizontal axis by spaced hinge components 61. Plate 60 is heated by the combustion of the fuel in compartment 21 and serves as a hot plate on which foods may be cooked at the exterior of the apparatus. Plate 60 is laterally offset at the foot end 33 of wall section 29 as seen in FIG. 2 and is provided with a handle 62 at the front side of the apparatus to enable the plate to be pivoted to an open position so that access to the compartment can be gained if desired through the rectangular opening 57.

The cooking compartment 20 projects above the hot plate 60 as seen in FIG. 2 and above the opening 34 the compartment is equipped with a rectangular grill 63 on which meats and other foods may be smoked and heated in the interior of the body portion 11. Grill 63 rests on a rectangular frame work 64 made up of angles 65 which are appropriately fixed to the wall sections 25 and 29 and the vertical extensions 30 and 31 of sections 22 and 23. Extension 30 has a rectangular opening 66 that is covered by a door 67 as seen in FIGS. 1 and 3, and the grill 63 may be removed from the cooking compartment 20 through opening 66 when the need arises to use a motorized barbequing device indicated at 68. This device 68 includes a motor 71 which is mounted exteriorly of the body on the rear side wall section 23 as seen in FIG. 3 and a spit rod shown in the figure by broken lines 69. The extension 30 of the front wall section 22 is provided with a vertical slot 73 which is reinforced by a U-shaped element 72 in the interior of the cooking compartment and extension 31 has an aperture 70 which is aligned with the base of the slot 73 and also reinforced internally with a U-shaped element 72. When the barbequeing device 68 is in use the spit rod 69 is supported in the slot 73 at the front of the apparatus whereas the other end of the rod extends through aperture 70 and is coupled to the motor 71. The drive coupling is of conventional design and readily permits the rod to be withdrawn from the coupling for removal of the cooked food on the rod 69.

At the lower end of the cooking compartment 20, the front side wall section 22 is provided with an elongated slot-like aperture 74 and here apparatus 10 is provided with a shallow rectangular drawer type pan 75 that serves as a receptacle for grease drippings and the like which fall through the grill 63 to the lower end of the compartment or from the foods being cooked on device 68. Pan 75 rests on the bottom wall section 24 and is provided with a suitable handle 76 to facilitate its withdrawal from the compartment when the need arises to dispose of the accumulated drippings that are received therein.

Door 67 is hinged at its upper end to the top wall section 32 by means of spaced hinges 80 and it is provided with a handle 81 at its lower end to facilitate the pivotal movement of the door about the horizontal axis provided by the hinges when access to the cooking compartment is desired. Door 67 has a rectangular opening 77 in the embodiment illustrated, and opening 77 is covered by a rectangular piece of heat resistant glass 78 that is held in place by an angle type retainer 79 which is fixed to the outside of the door 67.

In the illustrated embodiment, a shallow rectangular drawer 82 for storing cooking utensils is provided beneath the grease pan. This drawer is slidably supported on suitably spaced angles 84 which are fixed to the underside of bottom wall section 24, and the drawer is provided with a suitable handle 83 for use in withdrawing the drawer for access purposes.

From FIG. 2 it is evident that the gaseous combustion products pass from the combustion chamber 21 into the cooking chamber 20 through opening 34 and thereafter are discharged from the cooking chamber through a venting system which is generally designated at 85. The system includes a pair of transversely extending rectangular openings 86 and 87 in the top wall section 32 of the body 11. These openings 86 and 87 are spaced apart and located adjacent the opposite sides 27 and 28 of the compartment and serve as discharge ports through which the gaseous combustion products received in chamber 20 are discharged therefrom. Each of the openings 86 and 87 have an open ended box like structure that is mounted on the top wall section 32 and which serve as flues, designated at 88 and 89, for mounting separate dampers 90 and 91 that are associated with the adjacent ports.

Each damper includes an elongated transversely extending rod 92 that is mounted in the flue and which is equipped with a rectangular plate 93 that provides a butterfly valve type arrangement in the flue. The rods 92 are bent at the front end of the apparatus to provide handles 94 which enable the chef to manually adjust the damper exteriorly of the body portion so as to control the discharge of the gaseous combustion products through the discharge port associated therewith.

The advantage to the dual vent arrangement in the venting system 85 resides in the ability to control the distribution of the heat between the hot plate 60 and cooking compartment 20. When damper 90 is in the open position seen in FIG. 2 and damper 91 is in the closed position seen in this figure, the gaseous products of the combustion of the fuel in compartment 21 tend to rise above the grate 37 and into close proximity to the underside of the hot plate 60 and from whence they pass through opening 34 into compartment 20 and ultimately through port 86 as indicated by the solid line arrows 95. Under such circumstances, the hot plate 60 is not only heated by radiation but receives substantial amounts of heat by convection due to the circulating gases.

On the other hand, when damper 90 is manipulated to a closed position 96 so as to obstruct the discharge of the gaseous products through port 86 and damper 91 is adjusted to the open position indicated at 97 so that all of the gases received in the compartment 20 are discharged through opening 87, the gaseous combustion products follow the path generally indicated by the broken line arrows 98 in FIG. 2 and wherein it will be noted that the gases take a more direct route in passing through opening 34 to the discharge port 87. This of course minimizes the amount of heat which is transmitted to the hot plate by convection and substantially reduces heat losses from the appaartus through the hot plate 60. As a result, more heat is supplied to the cooking compartment 20 enabling, with a given size combustion compartment, to provide a larger cooking compartment than when a single vent system is used for venting the gases from the cooking compartment.

From the foregoing it will be seen that by suitably adjusting dampers 90 and 91 the amount of heat which is distributed to the hot plate 60 and cooking compartments can be regulated to suit the needs for heat in the respective areas. It may also be pointed out at this point that the opening 34 between the two compartments is so located as to avoid obstructing the lateral movement of the gases from beneath the hot plate through the opening as would be caused for example by so locating the foot end 33 of the center wall section beneath the hot plate to create a pocket for the accumulation of hot gases immediately below the hot plate.

While only a certain preferred embodiment of this invention has been shown and described by way of illustration, many modifications will occur to those skilled in the art and it is, therefore, desired that it be understood that it is intended in the appended claims to cover all such modifications as fall within the true spirit and scope of this invention.

What is claimed as new and what it is desired to secure by Letters Patent of the United States is:

1. In a portable outdoor food cooking apparatus, the improvement comprising: a hollow body portion that includes a food cooking compartment having opposite sides, and a fuel combustion compartment located laterally of one of said sides, and means including wheels supporting said body portion spacedly above the ground; said cooking compartment comprising an upright wall section at one of said sides having a foot end, and a top wall section extending between said opposite sides and fixed to said upright wall section at said one of said sides; said combustion compartment having an upwardly facing opening at its upper end and a horizontally arranged plate covering said opening and heated by the combustion of fuel therebelow, said plate being located laterally of said upright wall section at said foot end thereof; said body portion having an interior opening below said foot end for the passage of the gaseous products of the combustion of fuel in said combustion compartment into said cooking compartment, and said top wall section having a pair of spaced ports respectively located adjacent said opposite sides for the discharge from the cooking compartment of the gaseous products received therein; and each of said ports having an associated damper which is manually adjustable exteriorly of the body portion to control the discharge of the gaseous combustion products through the port associated therewith.

2. In a portable outdoor food cooking apparatus, the improvement in accord with claim 1 further comprising: baffle means in said interior opening arranged to deflect the gaseous products passing therethrough upwardly in said cooking compartment, a horizontally arranged grill supported in said cooking compartment spacedly above said interior opening, and a receptacle underlying said grill for receiving grease drippings therein.

3. In a portable outdoor food cooking apparatus, the improvement comprising: a hollow body portion having opposite ends and which includes a food cooking compartment having opposite sides including one side at one of said opposite ends, and a fuel combustion compartment located laterally of the other side of said opposite sides; said body portion having a bottom wall section that extends between said opposite ends, and said cooking compartment having an upright wall section located at said other side and generally intermediate of said opposite ends, an end wall section mounted upright at said one of said opposite ends, and a top wall section extending between said opposite sides and fixed to said upright wall section and said end wall section, said upright wall section having a foot end located spacedly above said bottom wall section; said combustion compartment having an upwardly facing opening at its upper end, adjustable draft means at its lower end, and a horizontally arranged plate covering said opening and heated by the combustion of fuel therebelow, said plate being located laterally of said upright wall section at said foot end thereof; said body portion having an interior opening below said foot end for the passage of the gaseous products of the combustion of fuel in said combustion compartment into said cooking compartment, and said top wall section having a pair of spaced ports respectively located adjacent said opposite sides for the discharge from the cooking compartment of the gaseous products received therein; and each of said ports having a flue mounted upright on said top wall section and arranged to receive the gaseous discharge through the port associated therewith, and a damper supported in the flue for controlling the discharge of the gaseous combustion products through said port; said body portion having baffle means in said interior opening arranged to deflect the gaseous products passing therethrough upwardly in said cooking compartment, a horizontally arranged grill supported in said cooking compartment spacedly above said interior opening, and a receptacle underlying said grill for receiving grease drippings therein.

References Cited

UNITED STATES PATENTS

| | | | |
|---|---|---|---|
| 1,189,818 | 7/1916 | Holloway | 126—19 XR |
| 2,350,948 | 6/1944 | Walker | 126—25 |
| 2,851,941 | 9/1958 | Cogar | 99—339 XR |

WALTER A. SCHEEL, Primary Examiner

JOHN M. BELL, Assistant Examiner

U.S. Cl. X.R.

99—446; 126—19, 25